Patented Mar. 13, 1945

2,371,189

UNITED STATES PATENT OFFICE 2,371,189

MINERAL FORTIFICATION OF FOODSTUFFS

Robert E. Sadtler, Ridley Park, Pa., assignor of one-fourth to Ney W. Underwood, Jr., Cleveland, Ohio, and three-fourths to Atlas Powder Company, Wilmington, Del., a corporation of Delaware No Drawing. Application July 2, 1943,
Serial No. 493,253

12 Claims. (Cl. 99—53)

The present invention relates to the mineral fortification of foodstuffs such as flour, cereals, and edible cereal products with salts of anacardic acid and tetrahydroanacardic acid and more particularly to the fortification with the copper, manganese and iron salts of these acids.

The principal object of my invention is to increase the copper, iron and/or manganese content of foodstuffs by the addition thereto of colorless, non-ionizing compounds of anacardic acid and tetrahydroanacardic acid, said compounds being non-ionizing in water, and insoluble in water and in dilute acids.

Another object of my invention is to restore the naturally occurring mineral constituents of whole cereal grains to milled or refined flour and other edible cereal products so that the final product will have approximately the same mineral content as that of the product prior to refining or milling.

A further object of my invention is the provision of a method of inclusion in foodstuffs of non-ionized iron, manganese and copper compounds of anacardic acid and tetrahydroanacardic acid, and which because of their non-ionization, under normal conditions, do not accelerate the development of rancidity in such foodstuffs.

A still further object of my invention is to provide assimilable mineral-fortified food compounds containing non-ionizing salts of anacardic acid and tetrahydroanacardic acid which are capable of preventing or correcting mineral deficiencies in animals when included in the diet of such animals.

In the milling of flour and other cereal products, a major portion of the naturally occurring mineral constituents such as iron, copper, manganese and calcium salts, are removed in the refining or milling operation and are found in the offal or by-products. Attempts have heretofore been made to restore these mineral constituents to the flour or other cereal products so that they will contain at least the equivalent mineral content of that present in the grain prior to the milling thereof. For example, an iron oxide saccharate solution has been applied to flour, as by spraying, but such a solution imparts a brown color to the flour which renders the flour undesirable for commercial purposes. Also, ferric chloride solution has been applied to flour but since it is highly ionized, it accelerates the development of rancidity in the flour and it also imparts an objectionable color to the flour.

My invention is based upon the discovery that the above-mentioned disadvantages may be obviated by incorporating a suitable amount of a non-ionized appropriate salt of anacardic acid or tetrahydroanacardic acid which is insoluble in water and in dilute acids into the flour or other foodstuff. These salts may be incorporated in the foodstuff in any desired manner. For example, when flour is to be treated, the powdered salt is blended with the flour by suitable mixing therewith, in a proportion of about 1 to 5 parts of the salt to about 1,000 parts of flour. If desired, a colloidal suspension of the salt of anacardic acid or tetrahydroanacardic acid may be sprayed on an edible cereal product.

In practicing my invention, I first prepare a suitable salt of anacardic acid or of tetrahydroanacardic acid. For example, if a suitable neutral or basic ferrous or ferric anacardate is desired it may be prepared as follows:

Basic ferrous anacardate—$Fe_2An_3$

A solution of disodium anacardate was made by dissolving 50 grams of anacardic acid in one liter of water containing 11.5 grams of sodium hydroxide. To this was added a solution of 38.8 grams of ferrous sulfate ($FeSO_4.7H_2O$) dissolved in a small amount of water. The precipitate was collected on a filter, washed, dried, and comminuted.

A ferrous sodium tetrahydroanacardate may be prepared as described above except that the anacardic acid is first converted into tetrahydroanacardic acid by hydrogenating anacardic acid in the presence of a suitable catalyst at an elevated temperature by conventional procedure.

Neutral ferrous anacardate—$FeAn_3$

A solution of sodium anacardate was made by dissolving 50 grams of anacardic acid in one liter of water containing 5.8 grams of sodium hydroxide. To this was added a solution of 19.4 grams of ferrous sulfate ($FeSO_4.7H_2O$) dissolved in a small amount of water. The precipitate was extracted with ether. The ether was removed and the residue taken up in hexane and the hexane was removed by distillation.

A neutral ferrous tetrahydroanacardate may be prepared by first converting the anacardic acid into tetrahydroanacardic acid, as described above, and then following the procedure outlined above.

Basic ferric anacardate—$FeAn_2$

A solution of disodium anacardate was prepared by dissolving 50 grams of anacardic acid in one liter of water containing 11.5 grams of sodium hydroxide. To this was added a solution of 14.9 grams of ferric chloride dissolved in a little water. The precipitate was separated from the water and taken up in hexane. Distillation of the hexane removed any absorbed water. Complete removal of the hexane left a solid salt.

A basic ferric tetrahydroanacardate may be prepared by first converting anacardic acid into tetrahydroanacardic acid, as described previously, and then following the procedure outlined above.

*Neutral ferric anacardate—FeAn₂*

A solution of sodium anacardate was prepared by dissolving 50 grams of anacardic acid in one liter of water containing 5.8 grams of sodium hydroxide. To this was added a solution of 7.5 grams of ferric chloride in a small amount of water. A precipitate was formed which was separated by means of hexane. Distillation of the hexane removed the water from the material and complete removal of the hexane left a solid salt.

A neutral ferric tetrahydroanacardate may be prepared by first converting anacardic acid into tetrahydroanacardic acid, as described above, and then following the procedure outlined above.

A neutral and a basic copper anacardate, which may be utilized according to the present invention, may be prepared as follows:

*Basic copper anacardate—CuAn*

A solution of disodium anacardate was made by dissolving 50 grams of anacardic acid in one liter of water containing 11.5 grams of sodium hydroxide dissolved in a small amount of water. To this was added a solution of 23.8 grams of copper chloride (CuCl₂.2H₂O). The solid precipitate thus formed was collected on a filter, washed and dried.

*Neutral copper anacardate—CuAn₂*

A solution of sodium anacardate was prepared by dissolving 400 grams of 90% anacardic acid in about two liters of water containing 42.8 grams of sodium hydroxide. To this solution was added a solution of 89.2 grams of cupric chloride dissolved in about 300 c. c. of water. A brownish-green oil precipitated partially in emulsified form. Ether was added, the layers separated, and the ether solution of the copper anacardate was washed with water, dried with sodium sulfate and concentrated by distillation.

*Neutral copper anacardate—Alternative procedure*

Copper hydroxide was prepared by adding a solution of 22.8 grams of sodium hydroxide in about 200 c. c. of water to a solution of 48.4 grams of cupric chloride in about 300 c. c. of water. The resulting precipitate of copper hydroxide was collected on a filter and washed thoroughly with water. The copper hydroxide was then transferred to a mortar while still somewhat wet and triturated thoroughly with 200 grams of anacardic acid. The product was a heavy, oily liquid containing a small amount of water, most of which is exuded during the trituration. The copper anacardate was spread in a thin film and allowed to dry in air.

A neutral and a basic copper tetrahydroanacardate, which may be utilized according to the present invention, may be prepared as follows:

*Copper tetrahydroanacardate—Neutral*

Ten grams of tetrahydroanacardic acid were dissolved in three hundred milliliters of hot water containing 0.57 gram of sodium hydroxide. The latter solution was cooled to about 40° C. and a solution of 1.43 grams of cupric acetate monohydrate in two hundred milliliters of water was added slowly with effective agitation. The resulting precipitate was collected on a filter, washed, and dried in air, yielding 11.2 grams of a solid having a melting point of 82 to 84° C.

*Copper tetrahydroanacardate—Basic*

Ten grams of tetrahydroanacardic acid were dissolved in three hundred milliliters of hot water containing 1.15 grams of sodium hydroxide. The latter solution was cooled to about 40° C. and a solution of 2.86 grams of cupric acetate monohydrate in two hundred milliliters of water was added slowly with effective agitation. The resulting precipitate was collected on a filter, washed with water, and dried in air to give 13.6 grams of a solid which did not melt below 200° C.

A neutral and a basic manganese anacardate, which may be utilized in accordance with the present invention, may be prepared as follows:

*Basic manganese anacardate—MnAn*

A solution of disodium anacardate was prepared by dissolving 50 grams of anacardic acid in one liter of water containing 11.5 grams of sodium hydroxide. To this was added a solution of 17.3 grams of manganous chloride (MnCl₂) dissolved in a small amount of water. The precipitate which formed was collected on a filter, washed, and dried.

*Neutral manganese anacardate—MnAn₂*

A solution of sodium anacardate was prepared by dissolving 50 grams of anacardic acid in one liter of water containing 5.8 grams of sodium hydroxide. To this was added a solution of 8.7 grams of manganous chloride dissolved in a small amount of water. The precipitate which formed was collected on a filter, washed, and dried.

The following neutral and basic manganese tetrahydroanacardates may be prepared and utilized according to the present invention:

*Neutral manganese tetrahydroanacardate*

Five grams of tetrahydroanacardic acid were dissolved in about three hundred milliliters of hot water containing 0.57 gram of sodium hydroxide, and the solution was cooled to about 40° C. To this solution was added with effective stirring a solution of 1.42 grams of manganous chloride tetrahydrate dissolved in about 100 milliliters of water. The resulting precipitate was collected on a filter and dried in air, yielding 5.55 grams of a solid melting at 142 to 147° C.

*Basic manganese tetrahydroanacardate*

Five grams of tetrahydroanacardic acid were dissolved in about three hundred milliliters of hot water containing 1.14 grams of sodium hydroxide and the solution was cooled to about 40° C. To this solution was added with effective stirring a solution of 2.83 grams of manganous chloride tetrahydrate dissolved in about 100 milliliters of water. The resulting precipitate was collected on a filter and dried in air, yielding 6.43 grams of a solid.

The salts, as thus prepared, may be used to fortify any suitable food product, such as flour, by mixing the salt with the flour in the following preferred relative proportions: .004% to 2%, by weight, of the salt, or .004 lb. to 2 lbs. per 100 pounds of flour, or other food.

While iron, copper, and manganese anacardates and tetrahydroanacardates have been specifically mentioned above, it will be understood that other salts of anacardic acid and of tetrahydroanacardic acid such as calcium and aluminum anacardates and tetrahydroanacardates, may be used instead of the iron, copper, or manganese anacardates and tetrahydroanacardates. However, the iron anacardate and tetrahydroanacardate is preferred because iron is required for the formation of hemoglobin. Also, copper and iron anacardates and tetrahydroanacardates together are beneficial and necessary to provide a mineral-fortified food which will correct anemic conditions.

It will, of course, be understood that the above-mentioned anacardate salts are substantially colorless, tasteless, and odorless and relatively non-hygroscopic and stable on storage. Therefore, one or more of these salts may be mixed or incorporated with flour or other cereal products during or after the milling thereof and the treated product will retain its original composition unimpaired.

Tannins occur in practically all natural food products and would give, with ionized iron, definite ink-like discoloration. Inks are quite frequently made by the use of ferric salts and tannic acid. However, I have found that my non-ionized copper, iron, and manganese anacardates and tetrahydroanacardates do not react with tannic acid under normal conditions. No discoloration occurs in food products which contain tannin, when iron, copper, and manganese anacardates and tetrahydroanacardates are added to them.

By the term "cereal products" as used in this specification and in the claims, I mean a product derived wholly or substantially from cereal grains or products derived from the milling thereof. As examples of these products, I may cite malted flours, farina, doughnut flour, bread and cake flours, breakfast cereals, pancake and biscuit flours.

The foregoing specification and description include the essential and distinctive thought of my invention, but it is to be distinctly understood that the same may be modified in various ways and/or combined with various other details without affecting the peculiar results obtained, and without departing from the spirit of the invention or the scope of the appended claims in which I intend to claim all the patentable novelty inherent in my invention.

I claim as my invention:

1. The method of fortifying edible flour and breakfast cereal with minerals which consists in blending a non-ionized salt of anacardic acid selected from the group consisting of copper, iron, and manganese anacardates, with the edible product in such proportion as to restore to the product approximately the mineral content thereof which existed prior to the refining thereof.

2. The method of fortifying refined edible flour and breakfast cereal with minerals which consists in blending a non-ionized salt of tetrahydroanacardic acid selected from the group consisting of copper, iron, and manganese tetrahydroanacardates, with the refined product in such proportion as to restore to the product approximately the mineral content thereof which existed prior to the refining thereof.

3. The method of fortifying edible flour and breakfast cereal with iron which comprises blending a non-ionized iron anacardate salt with the refined product in such proportion as to restore to the product substantially the iron content thereof which existed prior to the refining of the product.

4. The method of fortifying edible flour and breakfast cereal with iron which comprises blending a non-ionized iron tetrahydroanacardate salt with the refined product in such proportion as to restore to the product substantially the iron content thereof which existed prior to the refining of the product.

5. The method of fortifying edible flour and breakfast cereal with manganese which comprises blending a non-ionized manganese tetrahydroanacardate salt with the refined product in such proportion as to restore to the product substantially the manganese content thereof which existed prior to the refining of the product.

6. An edible solid mixture of a mineral fortified cereal product consisting of such a product blended with a non-ionized salt of anacardic acid selected from the group consisting of copper, iron, and manganese anacardates.

7. An edible solid mixture of a mineral fortified cereal product consisting of such a product blended with a non-ionized salt of tetrahydroanacardic acid selected from the group consisting of copper, iron, and manganese tetrahydroanacardates.

8. An edible mineral fortified flour consisting of refined flour blended with a non-ionized iron anacardate salt.

9. An edible mineral fortified flour consisting of refined flour blended with a non-ionized iron tetrahydroanacardate salt.

10. An edible mineral fortified flour consisting of refined flour blended with a non-ionized manganese tetrahydroanacardate salt.

11. The method of fortifying edible flour and breakfast cereal with minerals which comprises blending a non-ionized salt of an acid selected from the group consisting of anacardic acid and tetrahydroanacardic acid and a metal selected from the group consisting of copper, iron, and manganese with the edible product in such proportions as to restore to the product approximately the mineral content thereof which existed prior to the refining thereof.

12. An edible solid mixture of a mineral fortified cereal product consisting of such a product blended with a non-ionized salt of an acid selected from the group consisting of anacardic acid and tetrahydroanacardic acid and a metal selected from the group consisting of copper, iron, and manganese.

ROBERT E. SADTLER.